(12) United States Patent
Redies et al.

(10) Patent No.: US 6,358,037 B1
(45) Date of Patent: Mar. 19, 2002

(54) FLASH REMOVAL APPARATUS

(75) Inventors: Thomas D. Redies, Saline; David A. Kohler, Tecumseh; Lawrence H. Weber, Saline, all of MI (US)

(73) Assignee: R & B Machine Tool Company, Saline, MI (US)

( * ) Notice: Subject to any disclaimer, the term of this patent is extended or adjusted under 35 U.S.C. 154(b) by 90 days.

(21) Appl. No.: 09/610,744

(22) Filed: Jul. 6, 2000

(51) Int. Cl.$^7$ .............................................. B29C 49/72
(52) U.S. Cl. ........................ 425/527; 83/618; 83/630; 83/914; 264/161; 264/536; 425/806
(58) Field of Search .................. 425/527, 806; 264/536, 161; 83/914, 630, 618, 620, 624, 626

(56) References Cited

U.S. PATENT DOCUMENTS

| | | | |
|---|---|---|---|
| 2,928,120 A | * 3/1960 | Leghorn et al. | 264/533 |
| 3,464,084 A | * 9/1969 | Thompson | 425/527 |
| 3,465,931 A | * 9/1969 | Rupert | 83/914 |
| 3,579,622 A | * 5/1971 | Shaw et al. | 264/536 |
| 4,380,423 A | * 4/1983 | Aoki | 425/806 |
| 4,449,913 A | * 5/1984 | Krishnakumar et al. | 264/161 |
| 4,468,368 A | 8/1984 | Hafele | 425/525 |
| 4,834,643 A | * 5/1989 | Klinedinst et al. | 264/536 |
| 4,982,635 A | * 1/1991 | Thatcher | 83/914 |
| 5,202,135 A | * 4/1993 | Yawn | 425/527 |

* cited by examiner

Primary Examiner—Robert Davis
(74) Attorney, Agent, or Firm—Reising, Ethington, Barnes, Kisselle, Learman & McCulloch, P.C.

(57) ABSTRACT

A flash removing apparatus is provided which has a pair of blades driven by an actuator through a linkage assembly, simultaneously and in opposite directions, between a bottle receiving position and a closed position to aid in removing flash from a plastic product disposed on the blades. Preferably, the blades can also be moved to a fully open position to permit a bottle to pass between the blades and increase manufacturing flexibility and efficiency of the apparatus. The linkage assembly has a center link rotatable about a fixed pivot and at least one link arm connected to the center link and operably connected to the actuator to unfold and fold the linkage assembly in response to movement of the actuator between its advanced and retracted positions. The folding and unfolding of the linkage assembly moves the blades between their open and closed positions in cycles to remove flash from consecutive plastic products.

14 Claims, 5 Drawing Sheets

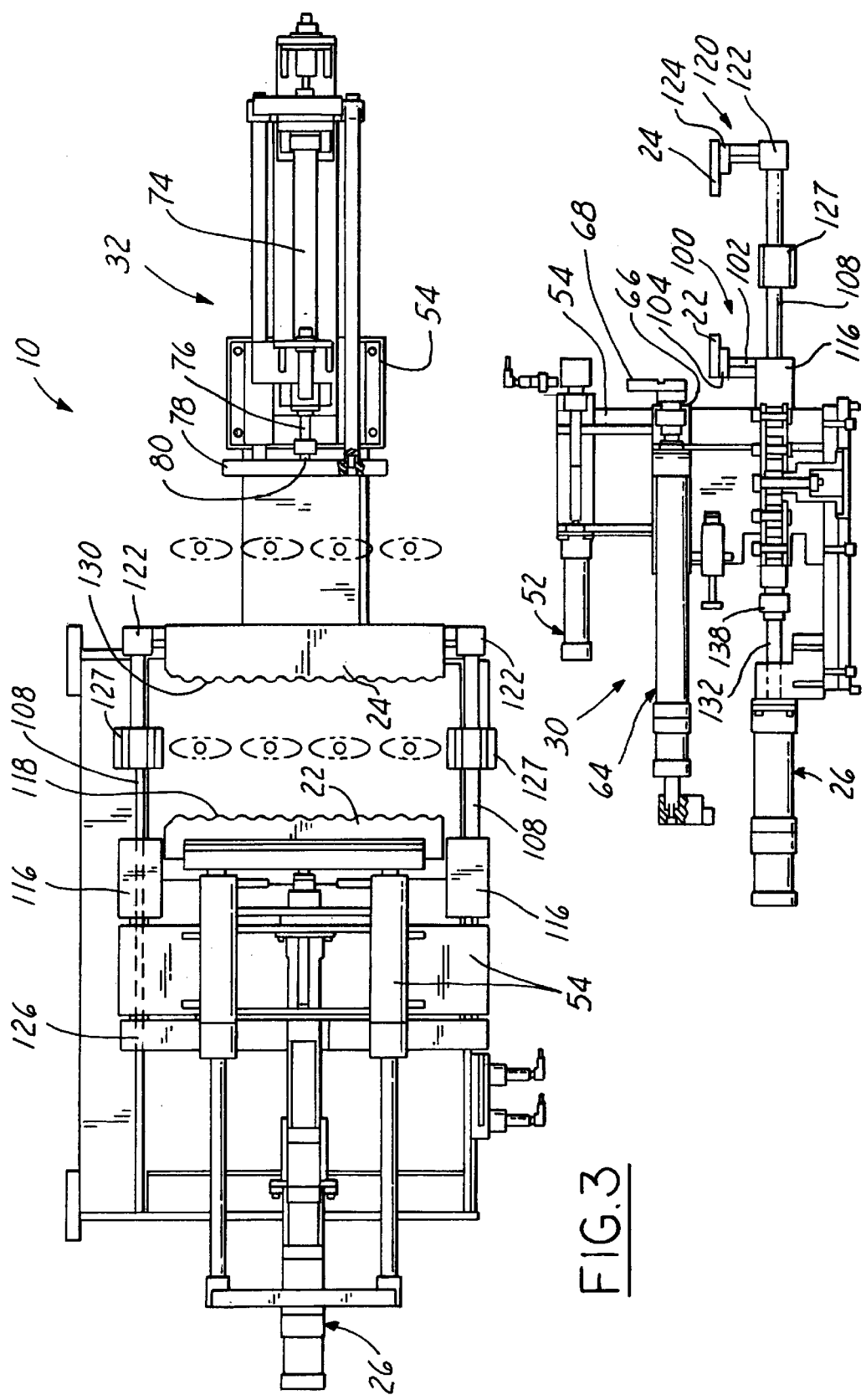

FLASH REMOVAL APPARATUS

FIELD OF THE INVENTION

The field of the invention relates to the manufacture of molded plastic products, and more particularly, to a flash removal apparatus for molded plastic products.

BACKGROUND OF THE INVENTION

In manufacturing molded hollow plastic products, it is common to use a blow molding process. Blow molding inherently leaves flash on the bottle where the molten parison material is trapped between the mold halves. To achieve the desired final appearance and finish, the flash needs to be removed.

Flash on the bottom of the bottle has been removed with a pair of blades by disposing the bottle on top of the blades with the flash disposed between the blades. One blade is fixed and the other blade is driven between advanced and retracted positions defining closed and open positions, respectively, of the blades. Undesirably, with the stationary blade in position to receive the bottle thereon, a bottle cannot be rejected at the flash removal workstation before the flash removal operation is performed. Additionally, the arrangement with one movable blade may not properly or completely remove the flash requiring the bottle to be rejected or a secondary flash removal operation which increase the time and cost to manufacture the bottles.

SUMMARY OF THE INVENTION

A flash trimming assembly is provided which has a pair of blades driven by an actuator through a linkage assembly, simultaneously and in opposite directions, between a bottle receiving position and a closed position to aid in removing flash from a plastic product disposed on the blades. Preferably, the blades can also be moved to a fully open position to permit a bottle to pass between the blades and increase manufacturing flexibility and efficiency of the apparatus. The linkage assembly has a center link rotatable about a fixed pivot and at least one link arm connected to the center link and operably connected to the actuator to unfold and fold the linkage assembly in response to movement of the actuator between its advanced and retracted positions. The folding and unfolding of the linkage assembly moves the blades between their open and closed positions in cycles to remove flash from consecutive plastic products.

In one embodiment, the flash trimming assembly is incorporated into a rotary blow-molding machine, such as may be used for forming plastic bottles. Freshly molded bottles are positioned on the blades with the flash to be removed from a bottle received between the blades. Thereafter, the blades are moved to their closed position to engage the bottle flash from opposed sides, and the bottle is moved relative to the blades to remove the flash from the bottle. Preferably, to facilitate removing bottles which do not meet desired specifications from the system, the blades can be moved to their fully open position permitting a bottle to pass between them without removing any flash from the bottle.

Accordingly, one advantage of incorporating opposing blades that move simultaneously is the ability to accurately and repeatedly clamp the bottle flash to facilitate satisfactory removal of the flash.

Another advantage of the present invention is to provide opposed blades driven simultaneously in opposed directions of the same stroke length by a single, linear actuator. This provides a more efficient, cost-effective apparatus.

Another advantage of the present invention is to provide for an efficient process for ejecting or rejecting bottles from the molding system. By moving the opposing blades to their filly open position, the bottles can be removed from the system quickly and easily.

Another advantage of the present invention is to reduce scrap, improve efficiency, and reduce associated costs in manufacturing plastic bottles.

Another advantage of the present invention is to provide a reliable, efficient apparatus to remove flash which is of relatively simple design and economical manufacture and assembly.

BRIEF DESCRIPTION OF THE DRAWINGS

These and other objects, features and advantages of this invention will be apparent from the following detailed description of the preferred embodiment and best mode, appended claims, and accompanying drawings in which:

FIG. 3 is a plan view of a portion of a rotary blow molding machine of FIG. 1 and the bottle flash trimming assembly with the blades in a fully open position;

FIG. 4 is a side view of the flash trimming assembly;

DETAILED DESCRIPTION OF THE PREFERRED EMBODIMENT

Figure 1:
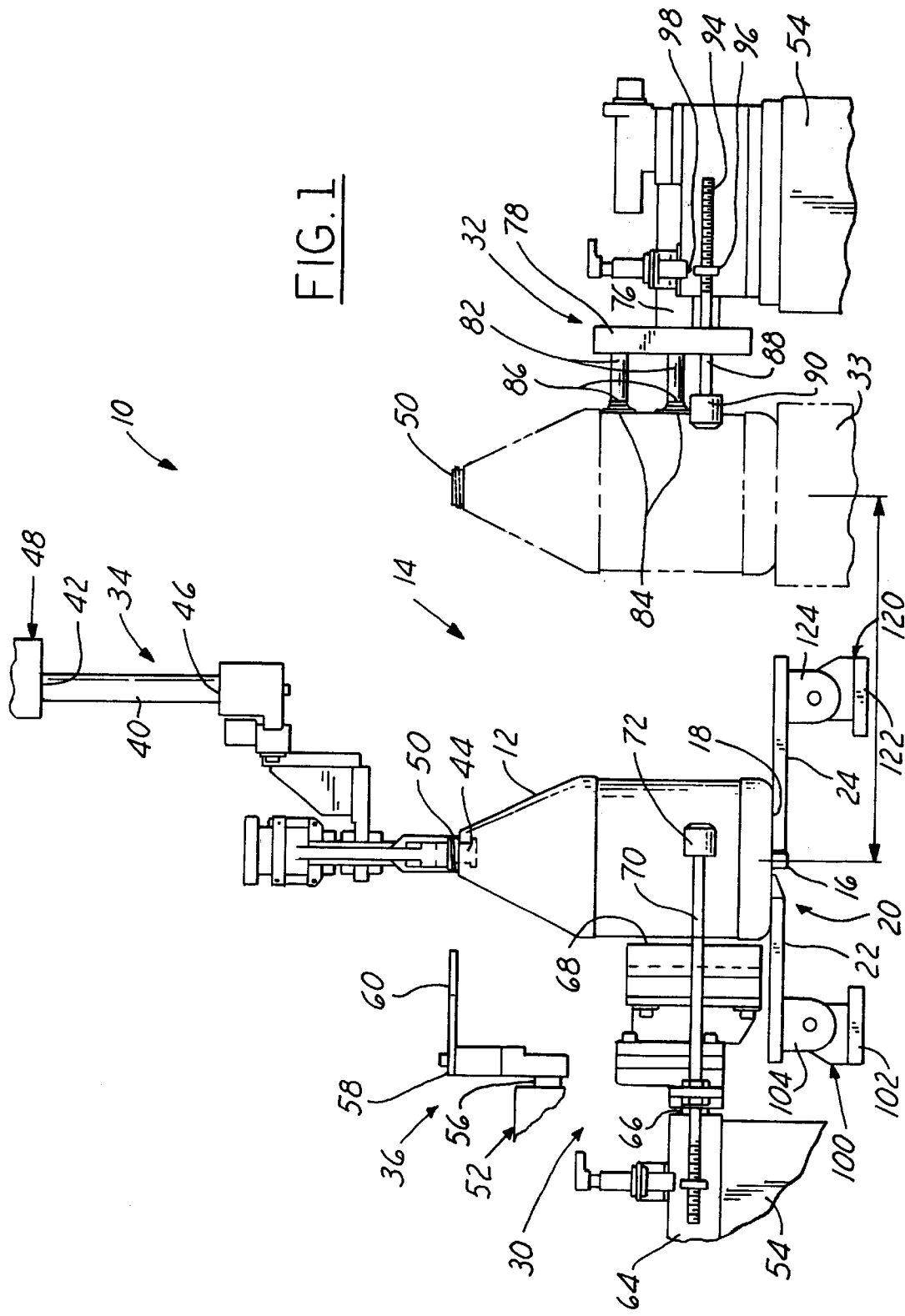
FIG. 1 is a side view of a portion of a rotary blow molding machine having a bottle flash trimming assembly embodying this invention and illustrating blades of the assembly in an intermediate, bottle receiving position.
Figure 2:
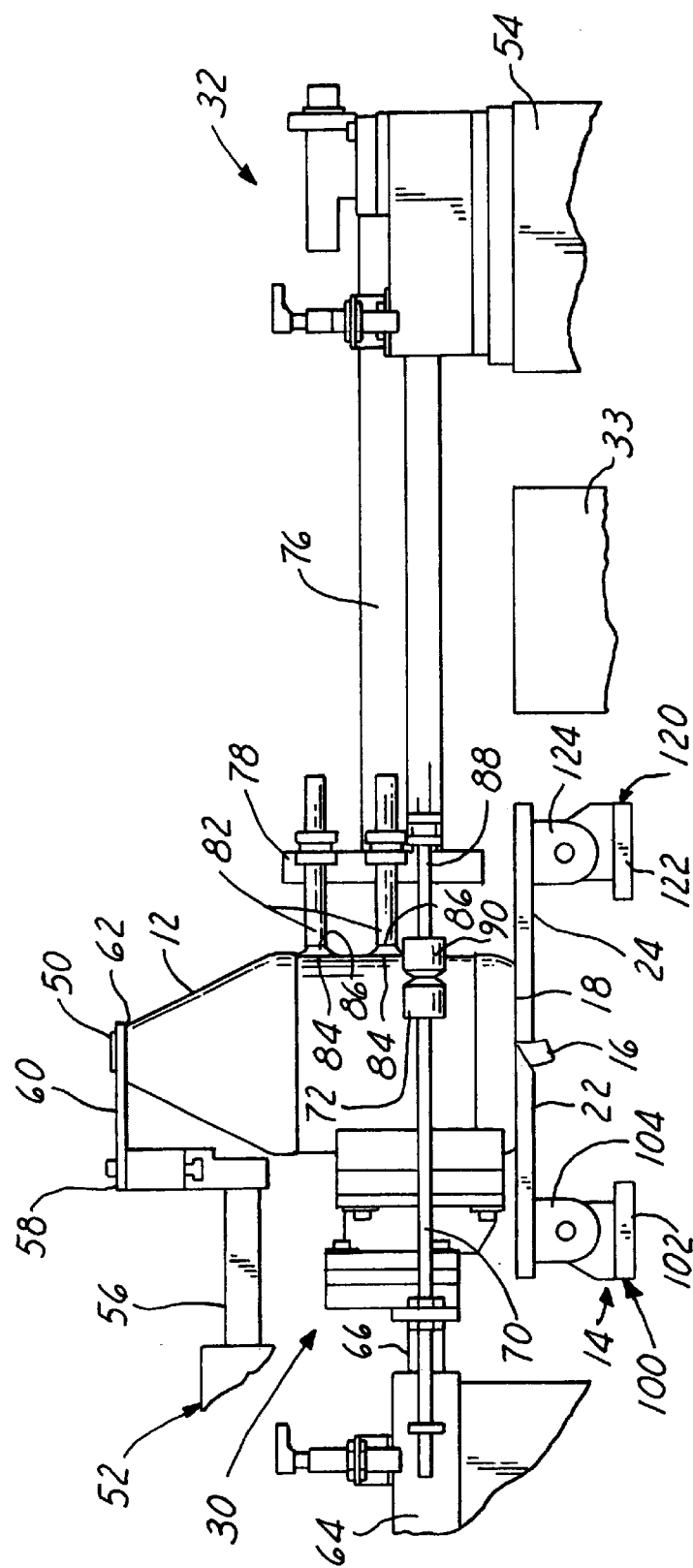
FIG. 2 is a side view of the blow molding machine of FIG. 1 illustrating the blades of the flash trimming assembly in their closed position engaging tail flash on a bottle.

Referring in more detail to the drawings, FIGS. 1–6 illustrate a portion of a rotary blow molding machine 10 used to form plastic bottles 12 and having a flash trimming workstation 14 wherein flash 16 along a bottom 18 of the bottle 12 is removed from each bottle 12. As best shown in FIGS. 5A and 5B, the workstation 14 has a flash trimming assembly 20 comprising first and second blades 22, 24 driven by an actuator 26 through a linkage assembly 28 in opposed directions from a bottle receiving position, as shown in FIG. 1, to a closed or flash engaging position as shown in FIG. 2. As shown in FIGS. 1 and 2, the workstation 14 has a pusher nest assembly 30 and transport guide assembly 32 which move the bottles 12 relative to the blades 22, 24 and transfer them to a conveyor 33 which moves the bottles 12 to downstream processing workstations.

Generally, in the manufacture of a plastic bottle 12, as best shown in FIG. 1, a bottle take out assembly 34 transfers a molded bottle 12 from a bottle mold cavity (not shown) to the flash trimming workstation 14 and places the bottle 12 on the blades 22, 24 of the flash trimming assembly 20 which are in their bottle receiving position. A stripper assembly 36 is advanced to ensure the bottle 12 is removed from the take out assembly 34 when the takeout assembly 34 is retracted from the bottle 12 and the pusher nest assembly 30 and the transport guide assembly 32 converge towards and engage opposed sides of the bottle 12 to hold it in an axially upright position. Next, the blades 22, 24 of the flash trimming assembly 20 are driven to their fully closed position shown generally in FIG. 2, such that the strip of flash 16 along the bottom 18 of the bottle 12 is captured between the blades 22, 24. The pusher nest assembly 30 is then advanced to push the bottle 12 from the blades 22, 24 to a conveyor, which carries the bottle 12 to a downstream workstation. To reset the flash trimming workstation 14, the flash trimming assembly 20, stripper assembly 36, pusher nest assembly 30 and transport guide assembly 32 are each retracted to permit the next bottle 12 to be processed.

In more detail, the bottle take out assembly 34 has a take out wheel (not shown), a plurality of take out arms 40 each carried at one end 42 on the take out wheel, and a take out pin 44 disposed at a free end 46 of each take out arm 40. The take out wheel is rotatably indexed to sequentially index the take out arms 40 relative to various workstations of the blow-molding machine 10. Each take out arm 40 is driven by a pneumatic cylinder 48 between an extended and a retracted position to vary the position of its take out pin 44 relative to the take out wheel. Each take out pin 44 can be expanded radially outwardly to increase its effective outer diameter and contracts radially inwardly to reduce its outer diameter relative to the expanded position, preferably under pneumatic control, to be receivable in and selectively engageable with a bottle mouth 50.

The stripper assembly 36 has an actuator 52, which is preferably a pneumatic cylinder, supported by a frame 54 of the blow molding machine 10, a stripper arm 56 driven between extended and retracted positions by the actuator 52, and a stripper fork 58 carried by the stripper arm 56 for co-movement therewith. The stripper fork 58 has two times 60 extending in a generally horizontal plane that are spaced apart a predetermined distance to be received around a bottle neck 62 to ensure that the bottle 12 is removed from the take out pin 44 of the take out assembly 34 when the take out assembly 34 is withdrawn from the bottle 12.

As best shown in FIGS. 1, 2 and 4, the pusher nest assembly 30 has an actuator 64 carried by the frame 54, a rod 66 driven between extended and retracted positions by the actuator 64, a plate 68 carried by the rod 66 and adapted to engage a side portion of the bottle 12, an arm 70, and a bumper 72 carried by the arm 70. The pusher nest assembly 30 is used to help remove flash 16 from the bottle 12 and to move the bottle 12 from the flash trimming workstation 14 to the conveyor.

As best shown in FIGS. 1–3, the transport guide assembly 32 has an actuator 74 carried by the frame 54, a rod 76 driven between retracted and advanced positions by its actuator 74, a mounting plate 78 connected to an end 80 of the rod 76, one or more arms 82 connected to and extending from the mounting plate 78, a suction cup 84 at a free end 86 of each arm 82, a limit arm 88, and a stop or bumper 90 carried by the limit arm 88. The suction cups 84 are adapted to engage a side portion of the bottle 12 in the flash trimming workstation 14 and may communicate a low pressure or vacuum source with the bottle 12 through a passage in each arm 82 to help to maintain engagement of the cups 84 with the bottle 12. One end 94 of the limit arm 88 is threaded and receives a nut 96 which cooperates with a proximity sensor 98 carried on the stationary frame 54 to indicate when the transport guide assembly 32 is fully retracted.

Figure 5A:
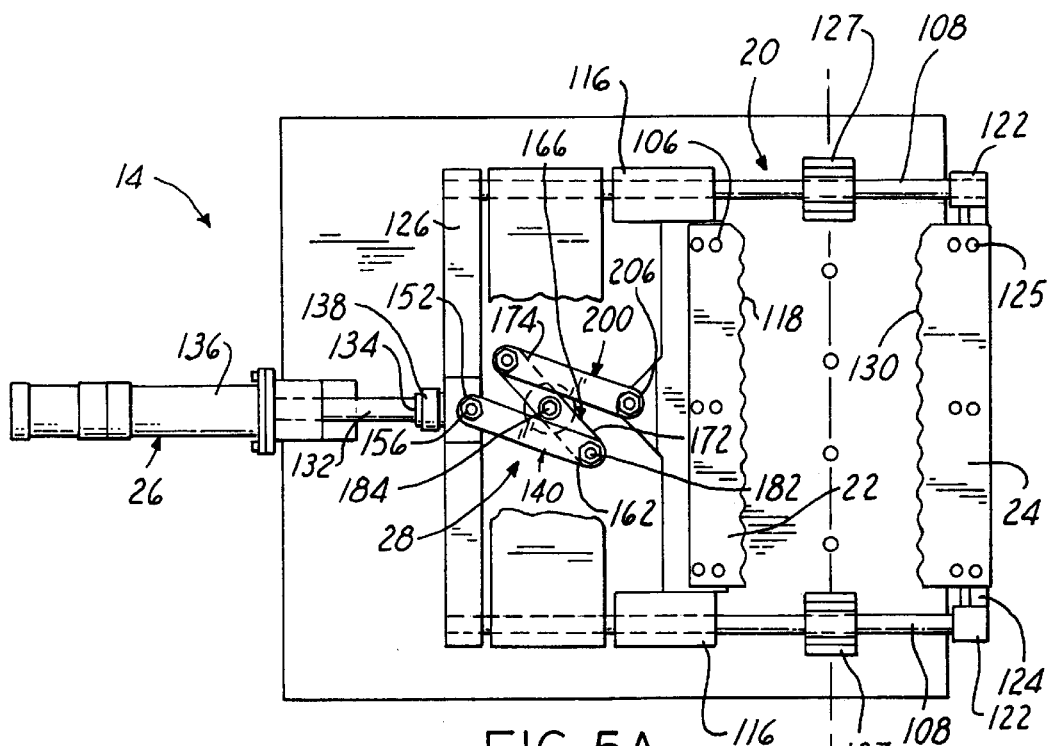
FIG. 5A is a plan view of a linkage assembly with the blades of the flash trimming assembly in their fully open position.
Figure 5B:
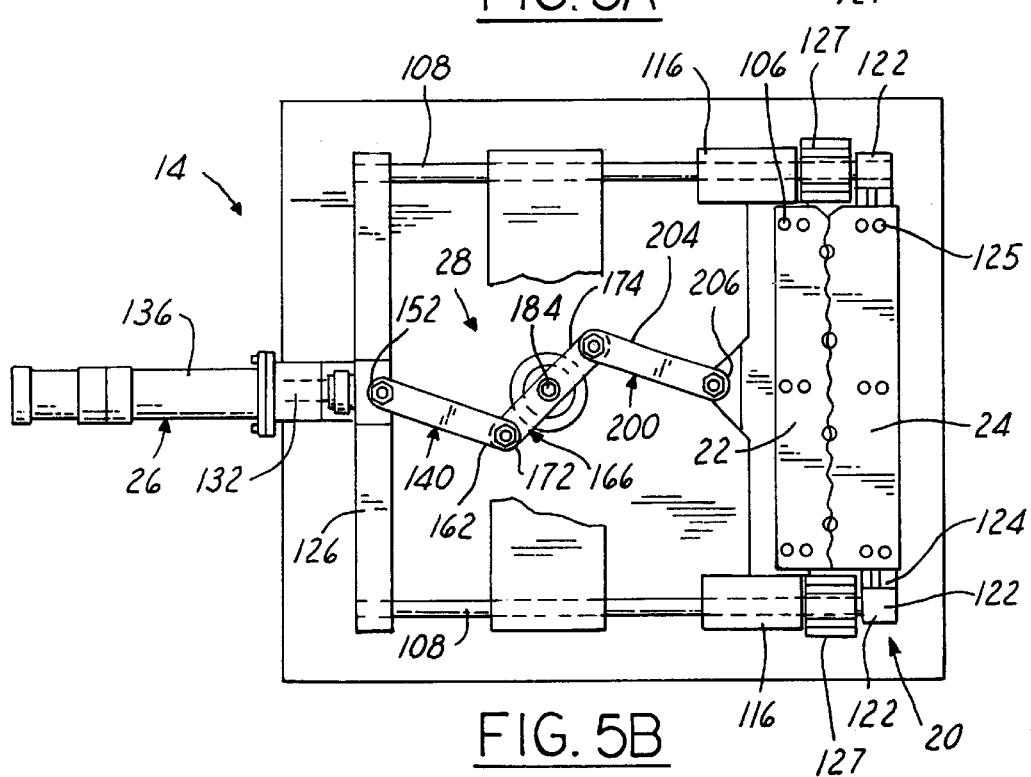
FIG. 5B is a plan view of the linkage assembly with the blades of the flash trimming assembly in their closed position.
Figure 6:
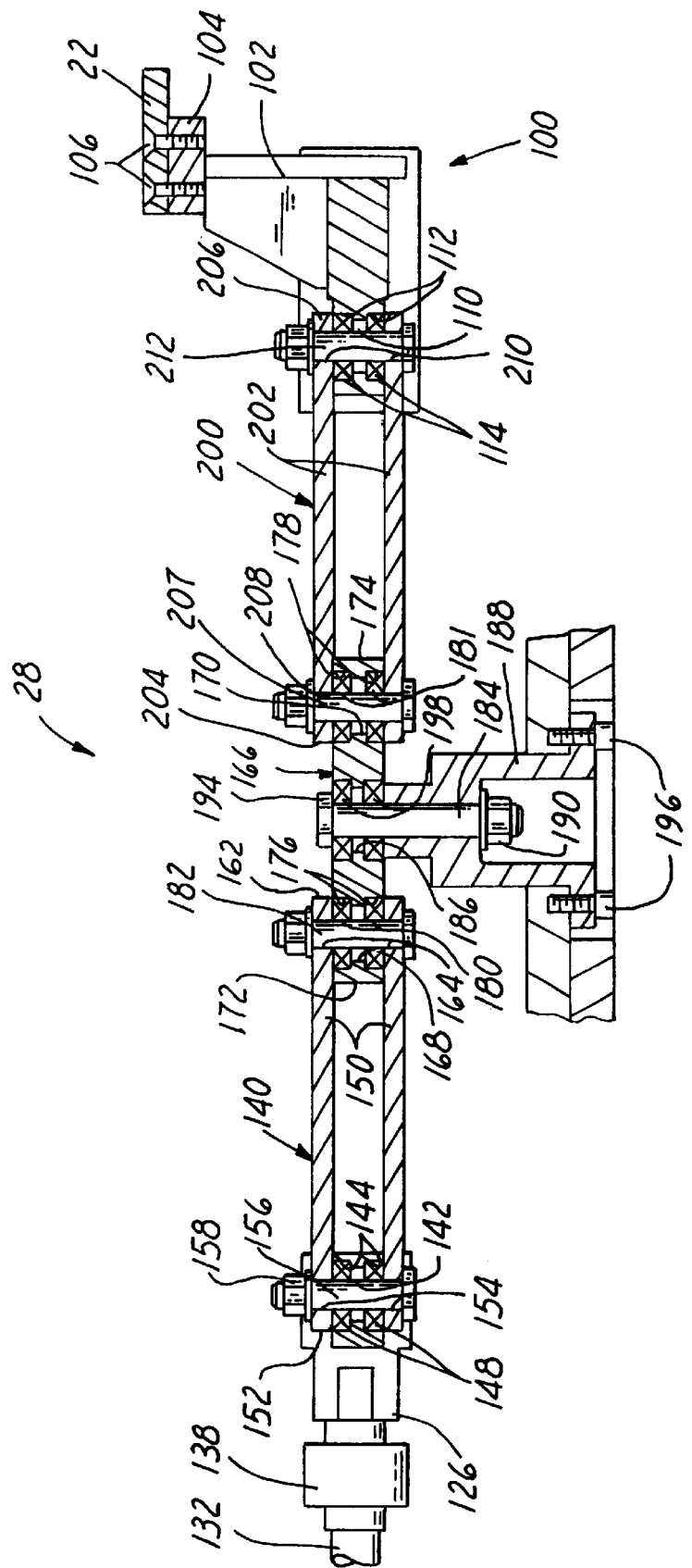
FIG. 6 is a side view of the linkage assembly in the position shown in FIG. 5B.

The flash trimming assembly 20 has first and second blades 22, 24 driven simultaneously in opposed directions by the single actuator 26 having a linear stroke to facilitate removing flash 16 from a molded plastic article. The first blade 22 is carried by a first carriage 100 which has a base 102, and a mounting plate 104 on the base 102 and to which the first blade 22 is fixed by capscrews 106 (FIGS. 5A and 5B). The base 102 extends between and is slidably received on a pair of spaced apart, parallel rails 108. As shown in FIG. 6, the base 102 of the first carriage 100 has a through bore 110, a pair of counterbores 112 and a bushing 114 in each counterbore 112. As shown in FIGS. 3, 5A and 5B, to facilitate its slidable movement along the rails 108, the base 102 is preferably fixed to bearing blocks 116 slidably received on the rails 108. The first blade 22 has a serrated leading edge 118 to facilitate severing or shearing off the flash 16 from the molded article. The first blade 22 is driven toward the second blade 24 by the actuator 26 and the linkage assembly 28 connected between the actuator 26 and first carriage 100.

As shown in FIGS. 1, 2 and 4, the second blade 24 is carried by a second carriage 120 which has a base 122 and a mounting plate 124 on the base 122 and to which the second blade 24 is fixed by cap screws 125. As best shown in FIGS. 5A and 5B, the base 122 is operably connected to a tie bar 126 for co-movement therewith by the pair of rails 108 extending between them. The rails 108 are slidably received through a pair of bearing blocks 127 attached to the frame 54. The tie bar 126 is in turn connected to the linkage assembly 28 and is driven by the actuator 26 to move the second blade 24. The second blade 24 preferably also has a serrated leading edge 130 to facilitate severing or shearing off the flash 16 from the molded article.

The actuator 26 may be a pneumatic cylinder and is carried by the frame 54. As best shown in FIG. 5A, the actuator 26 has an actuator rod 132 driven between retracted and extended positions to move the blades 22, 24 between their fully open and fully closed positions. The actuator rod 132 has a free end 134 extending out of an actuator housing 136 and connected to a coupler 138 which, in turn, is connected to the tie bar 126. The tie bar 126 in turn, is connected to a first link 140 of the linkage assembly 28. As best shown in FIG. 6, the tie bar 126 has a through bore 142 and a pair of counterbores 144 opening to opposed sides of the tie bar 126 and in each of which a bushing 148 is disposed to facilitate pivotal movement of the first link 140 relative to the tie bar 126.

The first link 140 is preferably defined by a pair of parallel plates 150 and has a first end 152 having aligned bores 154 through both plates 150 for connection to the tie bar 126 by a bolt 156 passing through the aligned bores 154, the bushings 148, and the through bore 142 in the tie bar 126. A nut 158 on one end retains the bolt 156. A second end 162 of the first link 140 has aligned bores 164 through both plates 150 to permit connection with a center link 166 in a similar manner.

The center link 166 has a first end 172 with a through bore 168 and a pair of counterbores 176 with a separate bushing 180 in each of the counterbores 176. To connect the first link 140 to the center link 166, a bolt 182 extends through the aligned bores 164 of the second end 162 of the first link 140 and through the bore 168 of the center link 166 and its associated bushings 180. To permit connection of the center link to a second link 200, a through bore 170, a pair of counterbores 178 and a separate bushing 181 in each counterbore 178 are provided in a second end 176 of the center link. The center link 166 rotates about a pivot pin 184 received through a through bore 186 between the first and second ends 172, 174 of the center link 166. The pivot pin 184 is fixed to a base 188 by a nut 190 on one end and has an enlarged head 194 at its other end bearing on the center link 166. The base 188 is in turn fixed to the frame 54 by several cap screws 196. Desirably, to journal the center link 166 for rotation, one or more bushings 198 are received in the through bore 186.

A second link 200 of the linkage assembly 28 has a pair of spaced apart parallel plates 202 having a first end and second end 204, 206 and is connected at the first end 204 to the second end 174 of the center link 166 by a bolt 207 extending through aligned bores 208 through each plate 202, the bushings 181 and the bore 170 through the center link 166. Aligned bores 210 through both plates 202 at the second end 206 of the second link 200 and the bore 110 through the base 102 of the first carriage 100 receive a bolt 212 in assembly to pivotally connect the second link 200 to the base 102 which carries the first blade 22.

So connected, the linkage assembly 28 is connected to the first blade 22 via the first carriage 100 and to the second blade 24 via the tie bar 126 which is operably connected to the second blade 24. As best shown in FIGS. 5A and 5B, the linkage assembly 28 is driven by the actuator 26 between a folded or retracted position (FIG. 5A) and an unfolded or extended position (FIG. 5B) when the actuator 26 is in its extended position and retracted position, respectively.

As the rod 132 is moved by the actuator 26 from its extended position shown in FIG. 5A to its retracted position shown in FIG. 5B, the tie bar 126 is pulled towards the actuator 26 and the second blade 24 is pulled toward the first blade 22. Simultaneously, movement of the tie bar 126 causes movement of the first link 140 connected thereto which in turn causes the center link 166 to rotate clockwise about the pivot pin 184 (as viewed in FIGS. 5A and 5B). This rotation of the center link 166 drives the second link 200 away from the actuator 26 to move the first blade 22 towards the second blade 24. Desirably, the first and second blades 22, 24 are moved relative to each other at the same rate and over the same stroke length to provide accurate engagement of the blades 22, 24 with the flash 16 on a bottle 12. In the embodiment shown and described, this is accomplished by pivoting the center link 166 midway between its ends 172, 174 and by providing the first and second links 140, 200 of the same effective length.

The actuator 26 retracts the rod 132 until the first and second blades 22, 24 are in their fully closed position shown in FIG. 5B. When the blades 22, 24 are in their closed position, the linkage assembly 28 is unfolded or extended with the first end 152 of the first link 140 and the second end 206 of the second link 200 at their furthest distance from one another. To open the first and second blades 22, 24 the actuator 26 drives the rod 132 toward its extended position which drives the tie bar 126 and the first link 140 connected thereto away from the actuator 26. Movement of the tie bar 126 also moves the second blade 24 connected thereto away from the first blade 22. This causes the center link 166 to rotate in a counterclockwise direction about the pivot pin 184 causing the second link 200 to move towards the actuator 26. The second link 200 pulls the first carriage 100 and hence, the first blade 22 connected thereto away from the second blade 24 as the second blade 24 likewise moves away from the first blade 22. When the rod 132 is fully extended, the blades 22, 24 are in their fully open position (as viewed in FIG. 5A) and the linkage assembly 28 is in its folded or retracted position.

Desirably, the linkage assembly 28 permits a single actuator 26 to move the first and second blades 22, 24 in opposed directions of the same stroke and speed, and in a very controlled manner to accurately and repeatedly engage the first and second blades 22, 24 with the flash 16 on the bottle 12. Also, the actuator 26 and linkage assembly 28 preferably drive the blades 22, 24 to an intermediate or bottle receiving position between the fully open and fully closed positions as best shown in FIG. 1. In this position, a molded bottle 12 can be received directly on the blades 22, 24 with a tail of flash 16 to be removed extending down between the blades 22, 24. In contrast, in the fully open position of the blades 22, 24, a bottle 12 may pass directly between the blades 22, 24. This is desirable to permit a bottle 12 to be rejected for quality control or other reasons.

OPERATION

In a rotary blow molding machine 10 for forming plastic bottles 12, after a bottle 12 is formed in a mold of the machine, a take out arm 40 is indexed into position adjacent to the mold and is driven to its extended position to insert its take out pin 44 into the bottle mouth 50 or opening of the bottle 12 while the bottle 12 is still in the mold (not shown). The take out pin 44 is expanded radially outwardly to engage and retain the bottle 12 on the takeout pin 44, and the take out arm 40 is retracted to remove the bottle 12 from the mold. The take out wheel 38 is indexed to position the take out arm 40 with the bottle 12 thereon directly above the first and second blades 22, 24. The take out arm 40 is then extended to dispose the bottle 12 on the first and second blades 22, 24 which are in their intermediate or bottle receiving position, shown generally in FIG. 1. The pusher nest 30 and transport guide 32 are advanced towards each other by their respective actuators 64, 74, until they engage and hold the bottle 12 in an upright position. The bumpers 72, 90 of the pusher nest 30 and transport guide 32, respectively, meet to prevent these mechanisms from collapsing or placing undue force on the bottle 12.

Next, to remove the bottle 12 from the take out pin 44, the actuator 52 advances the stripper fork 58 until the times 60 are on opposed sides of the bottle neck 62. The take out pin 44 is contracted and the take out arm 40 is retracted to withdraw the takeout pin 44 from the bottle 12. Should the bottle 12 adhere to the take out pin 44, the stripper fork 58 will knock the bottle 12 off of the take out pin 44 to ensure separation of the bottle from the pin 44.

With the bottle 12 positioned on the blades 22, 24 the flash trimming assembly 20 is driven by the actuator 26 so that the blades 22,24 move simultaneously towards each other in opposed directions until they engage the bottle flash 16 in their fully closed position. With the bottle flash 16 engaged on opposed sides by the first and second blades 22, 24 the actuator 64 advances the pusher nest 30 which drives the transport guide 32 via the engaged bumpers 72, 90 to push the bottle 12 from the first and second blades 22, 24 onto the conveyor 33 without crushing or collapsing the bottle 12. The bottle flash 16 remains between the first and second blades 22, 24 and thus is separated from the bottle 12 and may be reclaimed and recycled.

The stripper assembly 36 and pusher nest assembly 30 return to their initial, retracted positions to begin another cycle. The flash trimming assembly 20 returns to its intermediate or bottle receiving position as shown in FIG. 1 to receive a subsequent bottle 12 to be processed. Desirably, a bottle 12 may be rejected or scrapped before the flash 16 on it is removed by moving the blades 22, 24 to their fully open position shown in FIG. 5A so that a bottle 12 may pass between them to be removed from the processing cycle. For example, at the start of a production run, the initial bottles 12 formed may not meet desired specifications and so, they may be rejected before any flash 16 is removed by passing these bottles between the fully opened blades 22, 24. After a desired time or number of bottles have been rejected, the blades 22, 24 are moved to their intermediate or bottle receiving position to conduct the flash removal operation on subsequent bottles.

What is claimed is:

1. A flash trimming apparatus, comprising:
   a frame;
   an actuator carried by the frame and having a rod driven between an extended position and a retracted position;
   a first blade carried by the frame for slidable movement between an extended position and a retracted position;
   a second blade carried by the frame for slidable movement between an extended position and a retracted position to define, in cooperation with the first blade, fully open and fully closed positions of the blades together; and
   a linkage operably connecting the actuator to both the first blade and the second blade to drive the blades simultaneously in opposed directions between the fully open and fully closed positions of the blades to facilitate trimming flash from a plastic article when the flash is disposed between the blades.

2. The apparatus of claim 1 wherein the actuator and linkage also drive the blades to an intermediate article receiving position between the fully open and fully closed positions of the blades and when the blades are in their fully open position, the article may pass between the blades.

3. The apparatus of claim 1 wherein the linkage is constructed and arranged to move the first blade and the second blade in opposed directions of the same stroke length and at the same rate.

4. The apparatus of claim 1 wherein the linkage has:
   a tie bar coupled to the rod for co-movement therewith and connected to the second blade;
   a pivot pin carried by the frame;
   a first link with a first end pivotally connected to the tie bar and a second end,
   a center link having a first end pivotally connected to the second end of the first link, a second end and being pivoted between its ends on the pivot pin; and
   a second link having a first end pivotally connected to the second end of the center link and a second end operably connected to the first blade.

5. The apparatus of claim 4 which also comprises a pair of spaced apart, parallel rails carried by the frame;
   a first carriage slidably received for linear reciprocation on the rails which carries the first blade; and
   a second carriage slidably received for linear reciprocation on the rails which carries the second blade and which is operably connected to the tie bar.

6. The apparatus of claim 4 wherein both the first and second blades have a serrated leading edge adapted to engage flash disposed between the blades.

7. The apparatus of claim 4 wherein the center link is pivoted midway between its ends and the stroke of the first blade is equal to but in the opposite direction of the stroke of the second blade.

8. The apparatus of claim 5 wherein the linkage assembly is disposed between the first carriage and the tie bar.

9. The apparatus of claim 8 wherein the linkage assembly is driven by the actuator between a fully retracted position wherein the tie bar and first carriage are closest to each other and an extended position wherein the tie bar and first carriage are furthest from each other.

10. The apparatus of claim 4 wherein the center link is pivoted midway between its ends and the first link and second link are of the same effective length so that the movement of the first blade is equal in length and rate and opposite in direction to the movement of the second blade.

11. The apparatus of claim 4 wherein the first and second blades are also operable in an intermediate position between the fully open and fully closed positions with the first and second blades adapted to receive an article thereon when they are in their intermediate position to facilitate removing flash from the article, and when the blades are in their fully open position, the article may pass between the blades.

12. In a rotary blow molding machine having a flash trimming workstation and a pusher nest assembly for advancing molded plastic articles from the flash trimming workstation, a flash trimming apparatus, comprising:
   a frame;
   an actuator carried by the frame and having a rod driven between an extended position and a retracted position;
   a tie bar coupled to the rod for co-movement therewith;
   a pivot pin carried by the frame;
   a linkage assembly having a first link with a first end pivotally connected to the tie bar and a second end, a center link having a first end pivotally connected to the second end of the first link, a second end and being pivoted between its ends on the pivot pin, and a second link having a first end pivotally connected to the second end of the center link and a second end;
   a first blade operably connected to the second end of the second link for substantially linear movement of the first blade in response to movement of the second link; and
   a second blade operably connected to the tie bar for co-movement therewith such that movement of the rod between its extended and retracted positions moves the first and second blades towards and away from each other between fully open and fully closed positions including an intermediate position between the fully open and fully closed positions in which a molded plastic article may be disposed on both blades with a piece of flash received generally between the blades so that when the blades are moved to their fully closed position they engage the flash from opposed sides and thereafter, the pusher nest assembly is advanced to move the plastic article from the blades separating the flash from the plastic article.

13. The apparatus of claim 12 wherein the center link is pivoted midway between its ends and the stroke of the first blade is equal to but in the opposite direction of the stroke of the second blade.

14. The apparatus of claim 12 wherein the center link is pivoted midway between its ends and the first link and second link are of the same effective length so that the movement of the first blade is equal in length and rate and opposite in direction to the movement of the second blade.

* * * * *